US007039385B1

(12) United States Patent
Hoffmann et al.

(10) Patent No.: US 7,039,385 B1
(45) Date of Patent: May 2, 2006

(54) METHOD AND APPARATUS FOR AUTOMATIC CENTER FREQUENCY TUNING OF TUNABLE BANDPASS FILTERS

(75) Inventors: Theodore J. Hoffmann, Cedar Rapids, IA (US); Mark M. Mulbrook, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 417 days.

(21) Appl. No.: 10/452,887

(22) Filed: Jun. 2, 2003

(51) Int. Cl.
  *H04B 1/16* (2006.01)
(52) U.S. Cl. ............... 455/340; 455/339; 455/307; 455/125
(58) Field of Classification Search ............... 455/339, 455/340, 266, 254, 307, 125; 333/17.1; 702/190
See application file for complete search history.

(56) References Cited

U.S. PATENT DOCUMENTS

| | | | |
|---|---|---|---|
| 5,949,832 A * | 9/1999 | Liebetreu et al. ............ 375/344 |
| 6,266,522 B1 * | 7/2001 | Holden et al. ............... 455/339 |
| 6,377,788 B1 * | 4/2002 | Elder et al. ................. 455/266 |
| 6,545,559 B1 * | 4/2003 | Cullbom et al. ............. 333/17.1 |
| 6,781,474 B1 * | 8/2004 | Douziech et al. ........... 333/17.1 |
| 2002/0068541 A1 * | 6/2002 | Helio et al. ................. 455/340 |

* cited by examiner

*Primary Examiner*—Edward F. Urban
*Assistant Examiner*—Adeel Haroon
(74) *Attorney, Agent, or Firm*—Nathan O. Jensen; Kyle Eppele

(57) ABSTRACT

A radio has a tunable bandpass filter that is tuned by apparatus within the radio. A reference generator generates a reference signal for use in tuning the tunable bandpass filter. The tunable bandpass filter receives the reference signal and provides a filter output signal. A digital signal processing and control processor is connected to the tunable bandpass filter to receive the filter output signal. The digital signal processing and control processor has a phase comparison function that provides a phase error metric from the filter output signal. The digital signal processing and control processor tunes the tunable bandpass filter to provide a desired phase error metric signal thereby tuning the tunable bandpass filter to the desired center frequency. The digital signal processing and control processor stores tunable filter parameters for the desired center frequency. The tuning process may be repeated for several desired center frequencies of the tunable bandpass filter.

11 Claims, 6 Drawing Sheets

METHOD AND APPARATUS FOR AUTOMATIC CENTER FREQUENCY TUNING OF TUNABLE BANDPASS FILTERS

BACKGROUND OF THE INVENTION

This invention relates to radios, tunable bandpass filters used in radios, and specifically to automatically tuning a bandpass filter.

Tunable bandpass filters are used in RF (radio frequency) and IF (intermediate frequency) stages of radio equipment such as transmitters and receivers. FIG. 1 is an exemplary block diagram of a radio receiver 10 employing a RF tunable bandpass filter 15 at the input to the receiver 10 connected between an antenna 12 and a low-noise amplifier 17. A IF tunable filter 20 is also used connected between a mixer 18 and an IF amplifier 22 or elsewhere within a receiver IF. A local oscillator or frequency synthesizer 16 provides the injection for mixer 18 for down conversion to IF. The tunable bandpass filters 15 and 20 provide needed selectivity to reduce image responses, interference, and spurious signal response problems brought about by strong adjacent frequency signals. The IF output is processed by a digital signal processing and control processor 25 where additional filtering, decimation, and demodulation are performed. A transmitter (not shown) with tunable bandpass filters may also be implemented with RF tunable bandpass filters and IF tunable bandpass filters. Bandpass filters in transmitters are used to reduce radiation of undesired signals such as harmonics, spurious responses, etc.

Tunable bandpass filters require time and effort by a test technician to adjust during production test for use in a product. Tunable bandpass filters may age over the lifetime of a radio degrading performance and may require periodic realignment by a technician. Manual tuning and adjustment of tunable bandpass filters by a technician can be costly.

Typically tunable bandpass filters are tested and aligned by injecting a test signal and monitoring the magnitude of the test signal at an output of the tunable filter. Monitoring the magnitude is straight forward and easily implemented. Unfortunately, peak magnitude of tunable bandpass filters can vary over the filter tunable bandwidth. If the passband of the tunable bandpass filter is wide enough, magnitude information is not enough to find the center of the passband unless the test signal is a swept frequency source.

What is needed is a method and apparatus that reduces or eliminates extensive manual tuning of tunable bandpass filters in radio equipment to reduce the cost of the radio while improving performance by utilizing processing power in the radio.

SUMMARY OF THE INVENTION

A radio having a tunable bandpass filter wherein the filter is tuned by apparatus within the radio is disclosed. The apparatus comprises a reference generator for generating a reference signal to tune the tunable bandpass filter to a desired center frequency. The tunable bandpass filter receives the reference signal and provides a filter output signal. A digital signal processing and control processor is connected to the tunable bandpass filter to receive the filter output signal. The digital signal processing and control processor provides a phase error metric from the filter output signal and tunes the tunable bandpass filter to provide a desired phase error metric signal thereby tuning the tunable bandpass filter to the desired center frequency.

The digital signal processing and control processor further comprises a phase comparison function that provides the phase error metric from the filter output signal. The phase comparison function comprises a low-frequency quadrature down converter tuned to a frequency below the desired center frequency to down convert the filter output signal into low-frequency in-phase and quadrature outputs. A high-frequency quadrature down converter is tuned to a frequency above the desired center frequency to down convert the filter output signal into high-frequency in-phase and quadrature outputs.

In the phase comparison function a low-frequency phase measurement block is connected to the low-frequency quadrature down converter to provide a low-frequency phase angle from the low-frequency in-phase and quadrature outputs. A high-frequency phase measurement block is connected to the high-frequency quadrature down converter to provide a high-frequency phase angle from the high-frequency in-phase and quadrature outputs.

A summing circuit compares the low-frequency phase angle and the high-frequency phase angle to provide a difference angle. An absolute value function removes a negative sign from the difference angle.

An integrate and dump circuit integrates and dumps the difference angle value thereby providing the phase error metric. The desired phase error metric signal may be a zero phase error metric, a minimum phase error metric, or a closest match phase error metric.

It is an object of the present invention to provide a method and apparatus that reduces or eliminates extensive manual tuning of tunable bandpass filters in radio equipment to reduce the cost of the radio while improving performance by utilizing processing power in the radio.

It is an advantage of the present invention to provide a method and apparatus for tuning tunable bandpass filters that does not require any exchange or adjusting of physical parts or labor.

It is a feature of the present invention to provide a method and apparatus that can be performed during radio test or periodically to compensate for any drift due to aging in the tunable filter over the lifetime of the radio.

BRIEF DESCRIPTION OF THE DRAWINGS

The invention may be more fully understood by reading the following description of the preferred embodiments of the invention in conjunction with the appended drawings wherein.

DETAILED DESCRIPTION

The invention described herein utilizes an automatic tuning process performed by a digital signal processing and control processor to tune a tunable bandpass filter to a desired center frequency. The present invention is applicable to tunable filters in any frequency range. The tunable filters may have one or more desired center frequencies within a frequency range. The tunable filter may be any type of tunable filter known in the art. The tunable filter may be tuned with any electrical tuning means such as varactor tuning or discrete stepped capacitor tuning.

Figure 1:
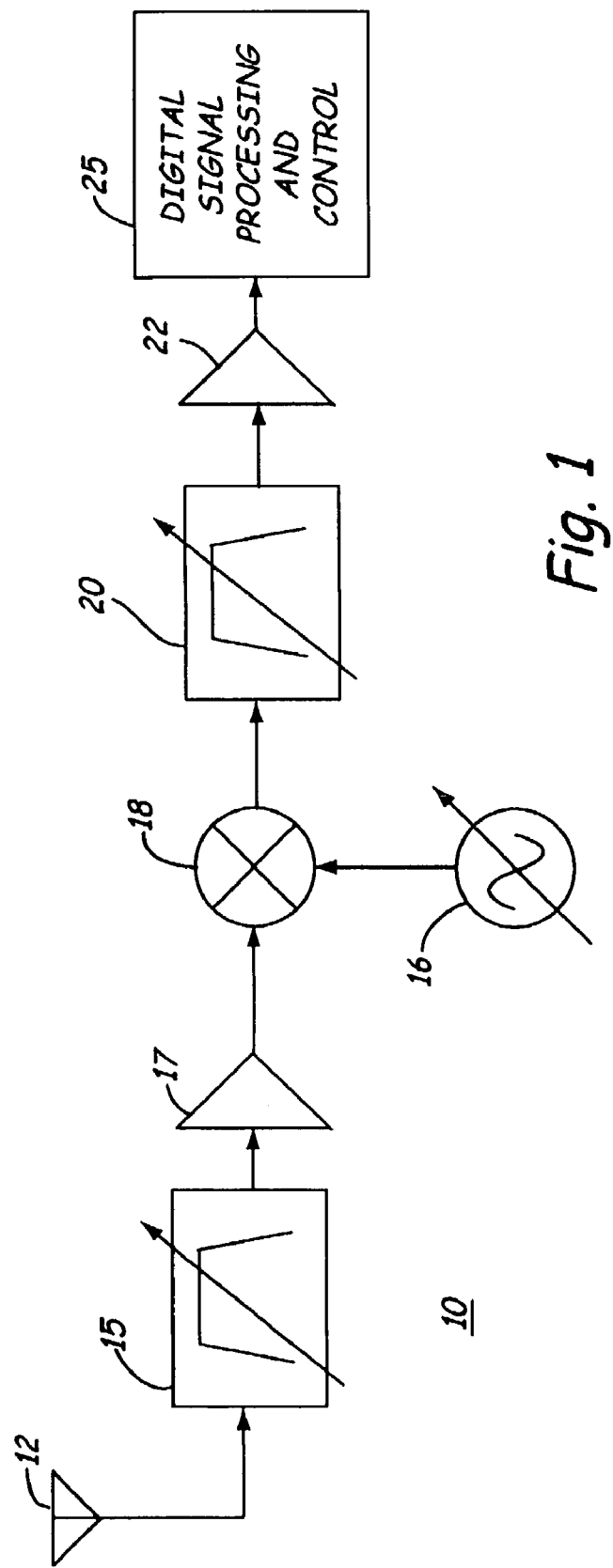
FIG. 1 is a block diagram of a radio receiver employing a tunable bandpass filter.
Figure 2:
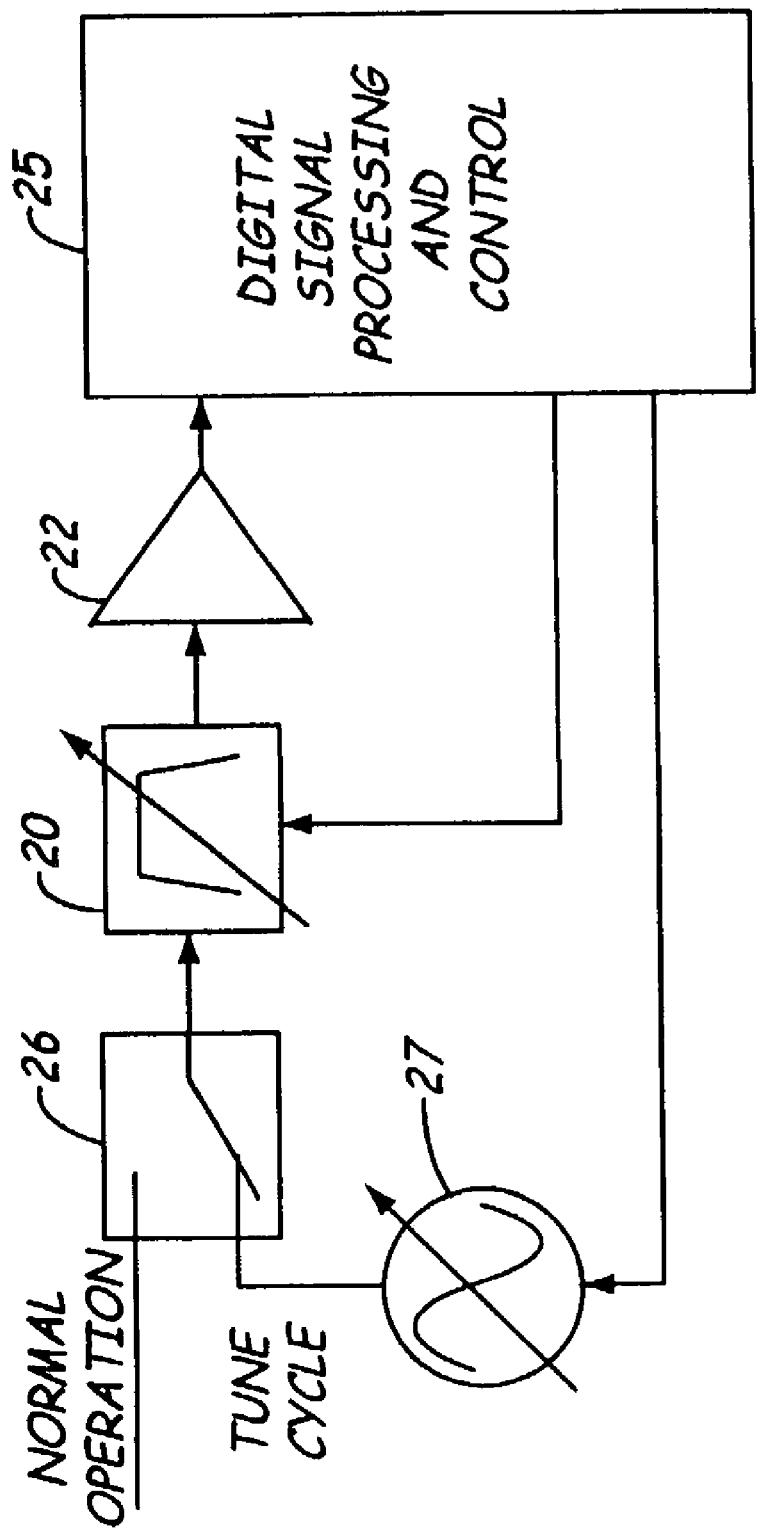
FIG. 2 is a block diagram showing how a tunable bandpass filter may be tuned using the present invention.

A tunable bandpass filter such as the RF tunable filter 15 or the IF tunable filter 20 used in a radio such as the receiver 10 in FIG. 1 is tuned automatically under the control of the digital signal processing and control processor 25 in the present invention. The present invention can be implemented to tune the IF filter 20 or the RF filter 15 as shown in FIG. 2 in a receiver of FIG. 1 or in a transmitter (not shown) as one skilled in the art can readily recognize. The present invention is described herein for an application for a receiver but can also be applied to a transmitter in a similar fashion.

In FIG. 2, the IF tunable filter 20, IF amplifier 22, and digital signal processing and control processor 25 from FIG. 1 are shown along with a switch 26 used to switch the IF tunable filter 20 between a normal operation signal path and a tune cycle signal path. In the tune cycle signal path a tuning reference generator 27 generates a test signal under control of the digital signal processing and control processor 25. The reference generator 27 may be located within the digital signal processing and control function 25. The reference generator 27 signal may be derived from the frequency synthesizer 16 of FIG. 1. The tuning reference generator 27 is tuned to a desired center frequency of the IF tunable filter 20. If the RF tunable filter 15 is being tuned, the reference generator 27 is tuned to the desired center frequency of the RF tunable filter 15.

Figure 3:
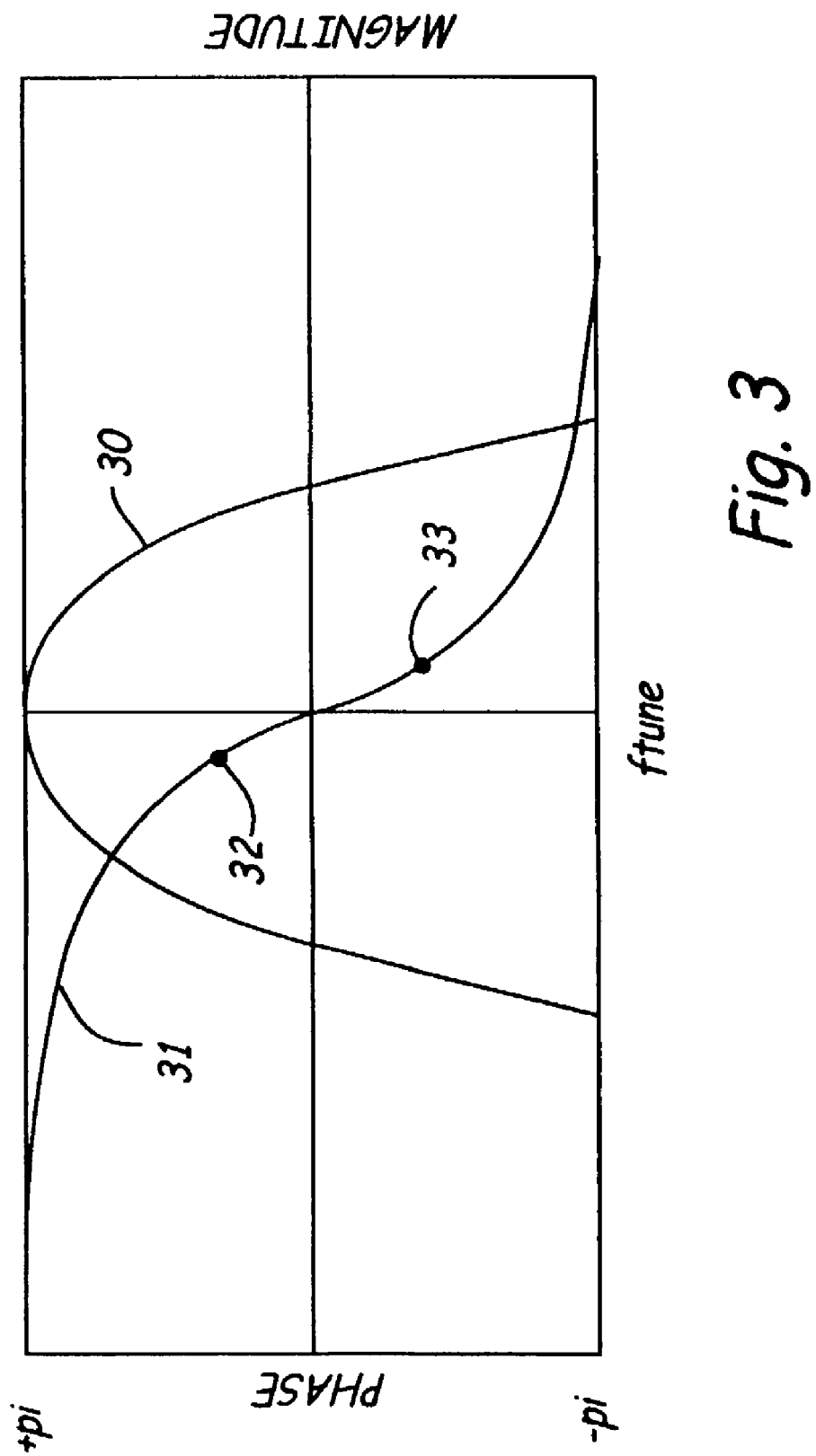
FIG. 3 is a graph showing a phase and frequency responses of a typical tunable bandpass filter.

FIG. 3 is a graph showing phase and frequency responses of a typical tunable bandpass filter. Phase shift is shown on the left and magnitude on the right vertical axes of the graph. Frequency is shown on the horizontal axis. Curve 30 shows the magnitude response of the filter and curve 31 the phase response of the typical filter. The tunable bandpass filter (15 or 20) desired center frequency is labeled ftune. Point 32 on phase response curve 31 is the phase shift of the tunable bandpass filter at some frequency ftune−$\Delta$f below the filter center frequency ftune. Point 33 on the phase response curve 31 is the phase shift of the tunable bandpass filter at some frequency ftune +$\Delta$f above the center frequency ftune. By comparing the phase shift at point 32 and with the phase shift at point 33 of signals obtained by down converting a signal at the desired center frequency ftune mixed with injection frequencies at ftune −$\Delta$f and ftune +$\Delta$f, it is possible to determine if the tunable bandpass filter is tuned to the desired center tune frequency.

Figure 4:
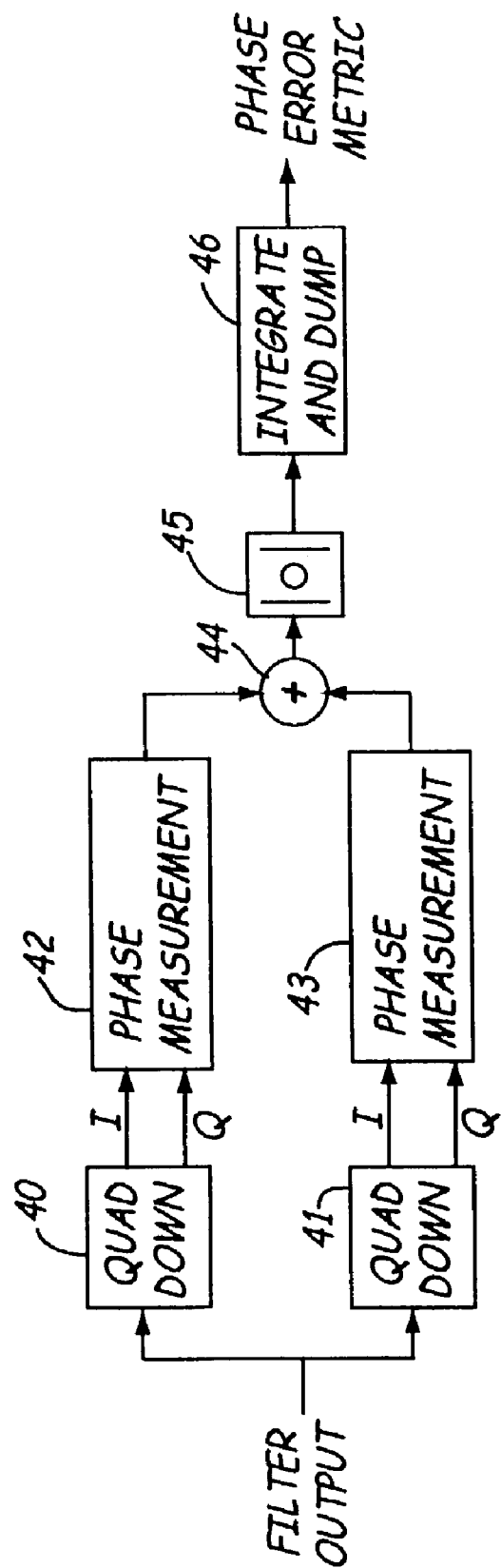
FIG. 4 is a block diagram of a phase comparison function used in the present invention.

The phase comparison is accomplished by applying the reference generator 27 signal tuned to ftune to tunable bandpass filter 15 or 20 through the switch 26 as shown in FIG. 2. A phase comparison function is shown in FIG. 4 where the signal output from the tunable bandpass filter 15 or 20 is applied to two down converters 40 and 41. One down converter is a low-frequency down converter 40 and is tuned to ftune −$\Delta$f point 32 on curve 31 and the other down converter 41 is a high-frequency down converter and is tuned to ftune +$\Delta$f point 33 on curve 31.

Figure 5:
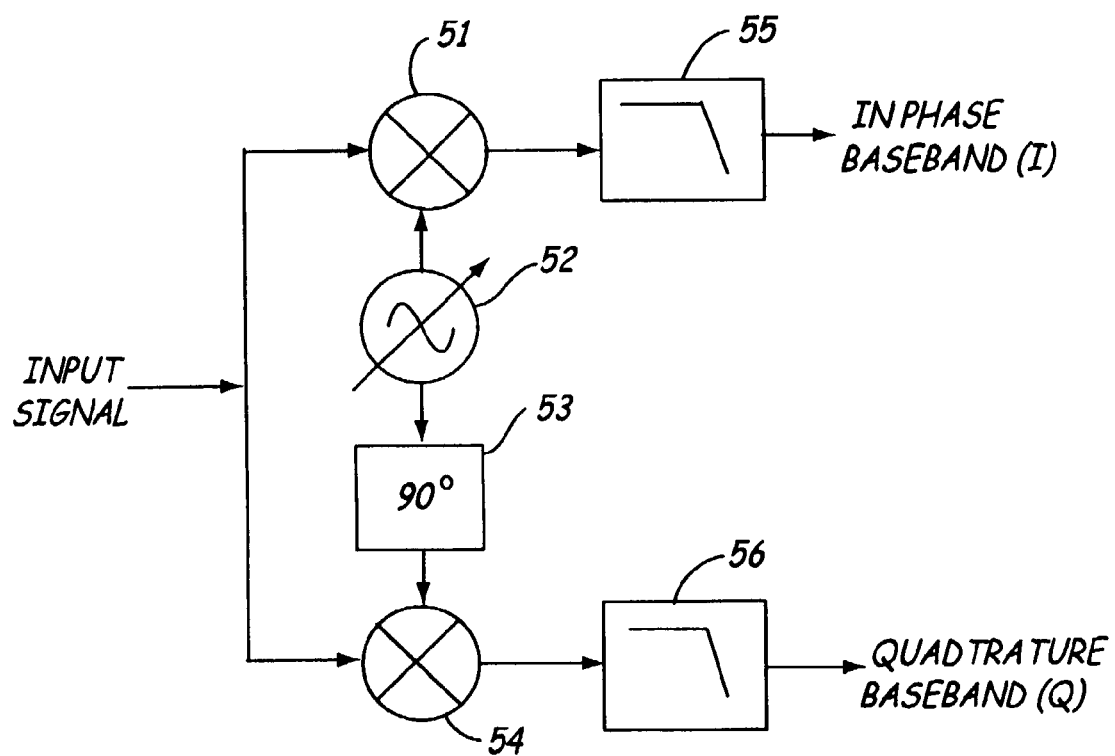
FIG. 5 is a block diagram of a quadrature down converter used in the phase comparison function of FIG. 4.

Each of the down converters 40 and 41 may be a quadrature down converter, shown in FIG. 5, that provides in-phase (I) and quadrature (Q) baseband outputs. The input signal from the tunable bandpass filter 15 or 20 is mixed in mixers 51 and 54 with an injection signal from oscillator 52 at either the ftune −$\Delta$f or the ftune +$\Delta$f frequency depending on down converter application. The injection signal from oscillator 52 is mixed directly with the tunable bandpass signal in mixer 51 to obtain the in-phase baseband signal. The injection signal from oscillator 52 is phase shifted 90° in phase shifter 53 before being mixed in mixer 54 to obtain the quadrature baseband signal. Filters 55 and 56 low-pass filter the in-phase and quadrature signals.

Referring back to FIG. 4, the I and Q outputs of the low-frequency down converter 40 are passed to a low-frequency phase measurement block 42 where a low-frequency phase angle measurement at ftune −$\Delta$f is determined from the I and Q outputs using techniques known in the art. Likewise the I and Q outputs of the high-frequency down converter 41 are passed to a high-frequency phase measurement block 43 where a high-frequency phase angle measurement at ftune +$\Delta$f is determined. Summing circuit 44 compares the low-frequency phase angle and the high-frequency phase angle and a difference angle is passed to an absolute value function 45 where any negative sign is removed. The output of the absolute value function 45 is integrated and dumped in integrate and dump circuit 46. The integrate and dump circuit is reset or dumped at a typical 40 microsecond rate and other rates are possible depending on the application of the present invention. The output of the integrate and dump circuit 46 is a phase error metric. A low or zero phase error metric is indicative of correct tuning of the tunable bandpass filter 20 to the desired center frequency.

The functions shown in FIG. 4 may be performed in the digital signal processing and control processor 25 shown in FIG. 2 after digital to analog conversion that is typically present in the digital signal processing and control processor 25. Within the digital signal processing and control processor 25, the phase error metric is monitored and the processor 25 adjusts the tuning of the filter 20 until the phase error metric is zero, near zero, or at some predetermined value. Tuning of the tunable bandpass filter is accomplished by electrically varying some parameter of the filter 15 or 20. A typical filter 15 or 20 may have 1024 different settings for different center frequencies. The filter parameter settings may be stored in memory (not shown) in the digital signal processing and control processor 25 for tuning the filter when radio operating parameters change. Using the automatic center frequency tuning of the present invention allows faster and more accurate tuning of the filter than with manual adjustment.

Figure 6:
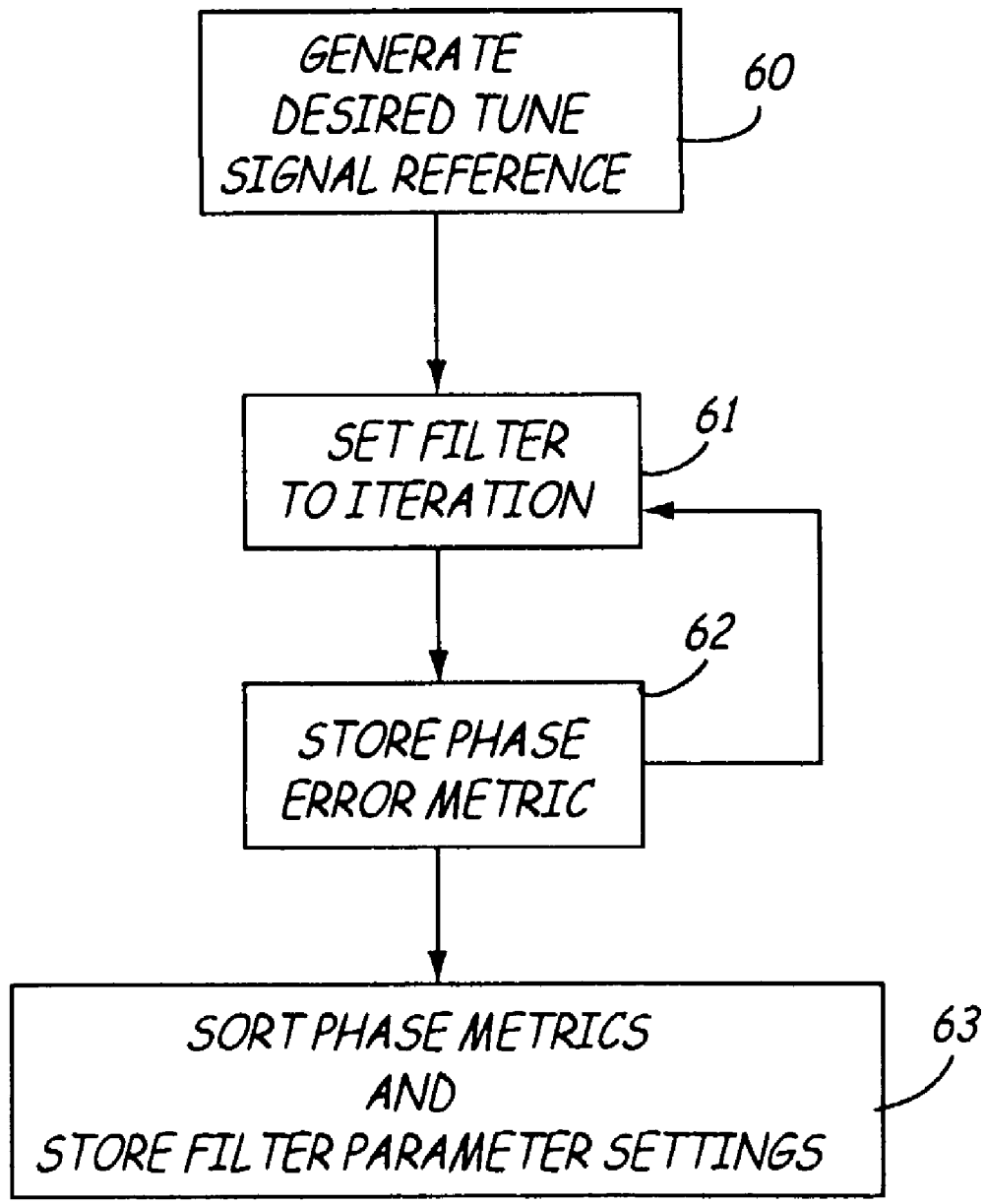
FIG. 6 is a flow chart showing processing steps used in the present invention to tune tunable bandpass filters.

FIG. 6 is a flow chart showing processing steps used in the present invention to tune tunable bandpass filters. At step 60, the reference generator 27 of FIG. 2 is tuned to a desired frequency. At step 61 the tunable bandpass filter 20 is set to a first tune iteration and the reference generator 27 output is applied to the tunable bandpass filter 20 through switch 26. A phase error metric is measured using the functions shown in FIG. 4 and stored at step 62. The filter is set to a next tune iteration by adjusting some parameter, depending on filter type, in the filter 20 and another phase error metric is measured and stored. The steps 61 and 62 are repeated until a zero phase error metric, a minimum phase error metric, or some predetermined phase error metric is found, depending on radio system requirements. At step 63 the stored phase error metrics are sorted through to find filter tune parameters that provide a desired phase error metric that may be the zero phase error metric, the minimum phase error metric, or a closest match to the predetermined phase error metric for the desired tune frequency. The tunable filter tune parameter settings for a desired center frequency may then be stored in memory. The steps in the flow chart in FIG. 6 may then be repeated for any number of additional desired center frequency tunable bandpass filter settings under control of the digital signal processing and control processor 25.

It is believed that the method and apparatus for automatic center frequency tuning of tunable bandpass filters of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A radio having a tunable bandpass filter wherein said tunable bandpass filter is tuned by apparatus within said radio said apparatus comprising:
   a reference generator for generating a reference signal to tune said tunable bandpass filter to a desired center frequency;
   the tunable bandpass filter for receiving the reference signal and providing a filter output signal; and
   a digital signal processing and control processor connected to the tunable bandpass filter to receive the filter output signal, to provide a phase error metric from the filter output signal, and to tune said tunable bandpass filter to provide a desired phase error metric thereby tuning said tunable bandpass filter to the desired center frequency said digital signal processing and control processor further comprising:
      a low-frequency quadrature down converter tuned to a frequency below the desired center frequency to down convert the filter output signal into low-frequency in-phase and quadrature outputs;
      a high frequency quadrature down converter tuned to a frequency above the desired center frequency to down convert the filter output signal into high-frequency in-phase and quadrature outputs;
      a low-frequency phase measurement block connected to the low-frequency quadrature down converter to provide a low frequency phase angle from the low-frequency in-phase and quadrature outputs;
      a high-frequency phase measurement block connected to the high-frequency quadrature down converter to provide a high-frequency phase angle from the high-frequency in-phase and quadrature outputs;
      a summing circuit for comparing the low-frequency phase angle and the high-frequency phase angle and providing a difference angle;
      an absolute value function for removing a negative sign from the difference angle; and
      an integrate and dump circuit for integrating and dumping the difference angle value thereby providing the desired phase error metric.

2. The radio having a tunable bandpass filter of claim 1 wherein said desired phase error metric comprises one of a zero phase error metric, a minimum phase error metric, and a closest match phase error metric.

3. The radio having a tunable bandpass filter of claim 1 further comprising a switch for switching the reference signal from the reference generator to the tunable bandpass filter.

4. A method of tuning a tunable bandpass filter to a desired center frequency in a radio having tuning apparatus within said radio comprising the steps of:
   generating a reference signal at the desired center frequency with a reference generator;
   providing the reference signal from the reference generator to the tunable bandpass filter;
   providing a filter output signal from said tunable bandpass filter;
   receiving the filter output signal in a digital signal processing and control processor connected to the tunable bandpass filter;
   down converting the filter output signal into low-frequency in-phase and quadrature output with a low-frequency quadrature down converter tuned to a frequency below the desired center frequency;
   down converting the filter output signal into high-frequency in-phase and quadrature outputs with a high-frequency quadrature down converter tuned to a frequency above the desired center frequency;
   providing a low-frequency phase angle from a low-frequency phase measurement block connected to the low-frequency quadrature down converter;
   providing a high-frequency phase angle a high-frequency phase measurement block connected to the high-frequency quadrature down converter;
   comparing the low-frequency phase angle and the high-frequency phase angle and providing a difference angle in summing circuit;
   removing a negative sign from the difference angle an absolute value function; and
   providing a phase error metric from an integrate and dump circuit that integrates and dumps the difference angle value; and
   tuning said tunable band pass filter with said digital signal processing and control processor to provide a desired phase error metric thereby tuning said tunable band pass filter to the desired center frequency.

5. The method of claim 4 wherein said digital signal processing and control processor further performs the step of storing tunable bandpass filter parameters for the desired center frequency.

6. The method of claim 5 wherein the steps of claim 5 are repeated for a second desired center frequency.

7. The method of claim 4 further comprising the step of switching the reference signal from the reference generator to the tunable bandpass filter with a switch.

8. An apparatus for tuning a tunable bandpass filter comprising:
   a reference generator for generating a reference signal for use in tuning the tunable bandpass filter,
   the tunable bandpass filter for receiving the reference signal and providing a filter output signal;
   a digital signal processing and control processor connected to the tunable bandpass filter to receive the filter output signal and to tune said tunable bandpass filter to provide a desired phase error metric thereby tuning said tunable bandpass filter to the desired center frequency wherein said digital signal processing and control processor further comprises a phase comparison function comprising:
      a low-frequency quadrature down converter tuned to a frequency below the desired center frequency to down convert the filter output signal into low-frequency in-phase and quadrature outputs:
      a high-frequency quadrature down converter tuned to a frequency above the desired center frequency to down convert the filter output signal into high-frequency in-phase and quadrature outputs:
      a low-frequency phase measurement block connected to the low-frequency quadrature down converter to provide a low-frequency phase angle from the low-frequency in-phase and quadrature outputs:

a high-frequency phase measurement block connected to the high-frequency quadrature down converter to provide a high-frequency phase angle from the high-frequency in-phase and quadrature outputs:

a summing circuit for comparing the low-frequency phase angle and the high-frequency phase angle and providing a difference angle;

an absolute value function for removing a negative sign from the difference angle; and an integrate and dump circuit for integrating and dumping the difference angle value thereby providing the desired phase error metric.

9. The apparatus of claim 8 wherein said digital signal processing and control processor stores tunable filter parameters for the desired center frequency.

10. The apparatus of claim 8 wherein said desired phase error metric comprises one of a zero phase error metric, a minimum phase error metric, and a closest match phase error metric.

11. The radio having a tunable bandpass filter of claim 8 further comprising a switch for switching the reference signal from the reference generator to the tunable band pass filter.

* * * * *